US012776291B2

(12) United States Patent
Mao et al.

(10) Patent No.: US 12,776,291 B2
(45) Date of Patent: Oct. 27, 2026

(54) DISPLAY DEVICE, DISPLAY CONTROL METHOD, AND NON-TRANSITORY COMPUTER STORAGE MEDIUM FOR REDUCING PIXEL BRIGHTNESS

(71) Applicants: Hefei BOE Joint Technology Co., Ltd., Hefei (CN); BOE TECHNOLOGY GROUP CO., LTD., Beijing (CN)

(72) Inventors: Jian Mao, Beijing (CN); Song Meng, Beijing (CN); Miao Liu, Beijing (CN)

(73) Assignees: HEFEI BOE JOINT TECHNOLOGY CO., LTD., Hefei (CN); BOE TECHNOLOGY GROUP CO. , LTD., Beijing (CN)

( * ) Notice: Subject to any disclaimer, the term of this patent is extended or adjusted under 35 U.S.C. 154(b) by 0 days.

(21) Appl. No.: 18/995,155

(22) PCT Filed: May 24, 2024

(86) PCT No.: PCT/CN2024/095078
§ 371 (c)(1),
(2) Date: Jan. 16, 2025

(87) PCT Pub. No.: WO2025/001663
PCT Pub. Date: Jan. 2, 2025

(65) Prior Publication Data

US 2026/0038459 A1 Feb. 5, 2026

(30) Foreign Application Priority Data

Jun. 29, 2023 (CN) ......................... 202310797347.2

(51) Int. Cl.
*G09G 5/10* (2006.01)
*G09G 5/00* (2006.01)

(52) U.S. Cl.
CPC ............... *G09G 5/10* (2013.01); *G09G 5/003* (2013.01); *G09G 2320/0233* (2013.01);
(Continued)

(58) Field of Classification Search
CPC .. G09G 5/10; G09G 5/003; G09G 2320/0233; G09G 2320/046; G09G 2320/0626; G09G 2320/068
See application file for complete search history.

(56) References Cited

U.S. PATENT DOCUMENTS

2005/0212726 A1* 9/2005 Namba .................... G09G 3/22 345/63
2008/0284702 A1* 11/2008 Shidara .................... G09G 3/20 345/90
(Continued)

FOREIGN PATENT DOCUMENTS

CN 1394437 A 1/2003
CN 103839509 A 6/2014
(Continued)

*Primary Examiner* — Rodney Amadiz
(74) *Attorney, Agent, or Firm* — XSENSUS LLP

(57) ABSTRACT

Provided is a display device. The display device includes a display panel and a control assembly, the display panel is electrically connected to the control assembly, the display panel includes a display region, and the control assembly is configured to: acquire display data; control the display panel to display based on the display data; detect whether target pixels are present in the display region, wherein the target pixels comprise bright pixels whose brightness reaches a specified brightness during a designated time period; and reduce brightness of the target pixels in response to the target pixels being present in the display region.

20 Claims, 9 Drawing Sheets

(52) U.S. Cl.
CPC ................. *G09G 2320/046* (2013.01); *G09G 2320/0626* (2013.01); *G09G 2320/0686* (2013.01)

(56) References Cited

U.S. PATENT DOCUMENTS

| | | | | |
|---|---|---|---|---|
| 2016/0140905 | A1* | 5/2016 | Yoo | G09G 3/3233<br>345/82 |
| 2018/0040271 | A1* | 2/2018 | Jung | G06F 3/1446 |
| 2020/0020303 | A1* | 1/2020 | Kim | G06V 20/635 |

FOREIGN PATENT DOCUMENTS

| | | | |
|---|---|---|---|
| CN | 105719617 | A | 6/2016 |
| CN | 105741767 | A | 7/2016 |
| CN | 106023887 | A | 10/2016 |
| CN | 108492767 | A | 9/2018 |
| CN | 110689588 | A | 1/2020 |
| CN | 110855917 | A | 2/2020 |
| CN | 111429840 | A | 7/2020 |
| CN | 113611241 | A | 11/2021 |
| CN | 114155809 | A | 3/2022 |
| CN | 114333709 | A | 4/2022 |

* cited by examiner

DISPLAY DEVICE, DISPLAY CONTROL METHOD, AND NON-TRANSITORY COMPUTER STORAGE MEDIUM FOR REDUCING PIXEL BRIGHTNESS

CROSS-REFERENCE TO RELATED APPLICATION

This application is a U.S. national stage of international application No. PCT/CN2024/095078, filed on May 24, 2024, which claims priority to Chinese Patent Application No. 202310797347.2, filed on Jun. 29, 2023, and entitled "DISPLAY DEVICE, DISPLAY CONTROL METHOD, AND NON-TRANSITORY COMPUTER STORAGE MEDIUM", the contents of which are incorporated herein by reference in their entireties.

TECHNICAL FIELD

The present disclosure relates to the field of display technologies, in particular to a display device, a display control method, and a non-transitory storage medium.

BACKGROUND

A display device is capable of realizing a display function and is controlled to display by a display control method.

In the display control method, display data is first acquired, and then the display device is controlled to display based on the display data, thereby realizing the control of the display device.

SUMMARY

Embodiments of the present disclosure provide a display device, a display control method, and a non-transitory computer storage medium. The technical solutions are given as follows.

According to some embodiments of the present disclosure, a display device is provided. The display device includes a display panel and a control assembly, the display panel is electrically connected to the control assembly, the display panel includes a display region, and the control assembly is configured to:

- acquire display data;
- control the display panel to display based on the display data;
- detect whether target pixels are present in the display region, wherein the target pixels include bright pixels whose brightness reaches a specified brightness during a designated time period; and
- reduce brightness of the target pixels in response to the target pixels being present in the display region.

In some embodiments, the control assembly is further configured to:

- determine whether the bright pixels are present in a corner area of the display region; and
- determine whether the bright pixels are the target pixels in response to the bright pixels being present in the corner area.

In some embodiments, the control assembly is further configured to:

- determine a proportion value of the bright pixels in the corner area; and
- determine that the bright pixels in the corner area are the target pixels in response to the proportion value falling within a target proportion range.

In some embodiments, the control assembly is further configured to:

- acquire a specified number of reference display images, wherein each of the reference display images contains a logo of a content provider of the reference display image;
- acquire reference proportions of the logo in each of the reference display images in the corner area of the display region; and
- determine the target proportion range based on a maximum value and a minimum value among the reference proportions.

In some embodiments, the control assembly is further configured to:

- determine that the bright pixels in the corner area are not the target pixels in response to the proportion value not falling within the target proportion range.

In some embodiments, the control assembly is further configured to:

- acquire an average brightness of first pixels in the corner area during the designated time period, wherein the designated time period is a time period prior to a current moment; and
- determine that the first pixels are the bright pixels in response to the average brightness being greater than or equal to the specified brightness.

In some embodiments, the control assembly is further configured to:

- acquire minimum brightness of first pixels in the corner area during the designated time period, wherein the designated time period is a time period prior to a current moment; and
- determine that the first pixels are the bright pixels in response to the minimum brightness is greater than or equal to the specified brightness.

In some embodiments, the control assembly is further configured to:

- acquire a duration when brightness of first pixels in the corner area is greater than or equal to the specified brightness during the designated time period, wherein the designated time period is a time period prior to a current moment; and
- determine that the first pixels are the bright pixels in a case that the duration is greater than or equal to a designated duration.

In some embodiments, the control assembly is further configured to:

- determine a proportion value of the bright pixels in the corner area;
- determine whether an image displayed in the display region is a static image in response to the proportion value falling within a target proportion range; and
- determine that the bright pixels are the target pixels in response to the image displayed in the display region being not the static image.

In some embodiments, the control assembly is further configured to:

- determine whether an image displayed in the display region is a static image;
- determine whether the bright pixels are present in a corner area of the display region in response to the image displayed in the display region being not the static image;
- determine a proportion value of the bright pixels in the corner area in response to the bright pixels being present in the display region; and determine that the bright pixels in the corner area are the target pixels in response to the proportion value falling within a target proportion range.

In some embodiments, the control assembly is further configured to:

reduce brightness of the display region as a whole in response to the image displayed in the display region being the static image.

In some embodiments, the control assembly is further configured to:

determine whether an image displayed in the display region is a static image; and reduce brightness of the display region as a whole in response to the image displayed in the display region being the static image.

In some embodiments, the control assembly is further configured to:

acquire first brightness data for a current frame set of the display device, wherein the current frame set is a set at least including a current frame;

acquire second brightness data for a history frame set of the display device, wherein the history frame set is a set at least including a frame preceding the current frame; and determine that the image displayed in the display region is the static image in response to a difference between the first brightness data and the second brightness data being less than a specified brightness threshold.

In some embodiments, the control assembly is further configured to:

determine the specified brightness threshold based on the second brightness data, wherein the specified brightness threshold is a product of the second brightness data and a target proportion range.

In some embodiments, the control assembly is further configured to:

acquire brightness data for the target pixels at the designated time period;

determine an attenuation factor corresponding to the brightness data in a predetermined look-up table based on the brightness data, wherein the look-up table includes a plurality of brightness data and attenuation factors corresponding to each of the brightness data;

determine an attenuated brightness of the target pixels based on a predetermined formula, wherein the predetermined formula includes $e=d*a*b$, e represents the attenuated brightness, d represents current brightness of the target pixels, a represents the attenuation factor, and b represents the brightness data for the target pixels at the designated time period; and reduce the current brightness of the target pixels to the attenuated brightness.

In some embodiments, the control assembly is further configured to:

acquire brightness of the target pixels in each of frames during the designated time period; and determine the brightness data based on the brightness of the target pixels in each of frames.

According to some embodiments of the present disclosure, a display control method for a display device is provided. The method includes:

acquiring display data;

controlling the display panel to display based on the display data;

detecting whether target pixels are present in the display region, wherein the target pixels include bright pixels whose brightness reaches a specified brightness during a designated time period; and reducing brightness of the target pixels in response to the target pixels being present in the display region.

In some embodiments, detecting whether target pixels are present in the display region includes:

determining whether the bright pixels are present in a corner area of the display region; and determining whether the bright pixels are the target pixels in response to the bright pixels being present in the corner area.

In some embodiments, determining whether the bright pixels are the target pixels includes: determining a proportion value of the bright pixels in the corner area; and determining that the bright pixels in the corner area are the target pixels in response to the proportion value falling within a target proportion range.

In some embodiments, the method further includes:

acquiring a specified number of reference display images, wherein each of the reference display images contains a logo of a content provider of the reference display image;

acquiring reference proportions of the logo in each of the reference display images in the corner area of the display region; and determining the target proportion range based on a maximum value and a minimum value among the reference proportions.

In some embodiments, the method further includes:

determining that the bright pixels in the corner area are not the target pixels in response to the proportion value not falling within the target proportion range.

In some embodiments, determining whether the bright pixels are present in the corner area of the display region includes:

acquiring an average brightness of first pixels in the corner area during the designated time period, wherein the designated time period is a time period prior to a current moment; and determining that the first pixels are the bright pixels in response to the average brightness being greater than or equal to the specified brightness.

In some embodiments, determining whether the bright pixels are present in the corner area of the display region includes:

acquiring minimum brightness of first pixels in the corner area during the designated time period, wherein the designated time period is a time period prior to a current moment; and determining that the first pixels are the bright pixels in response to the minimum brightness is greater than or equal to the specified brightness.

In some embodiments, determining whether the bright pixels are present in the corner area of the display region includes:

acquiring a duration when brightness of first pixels in the corner area is greater than or equal to the specified brightness during the designated time period, wherein the designated time period is a time period prior to a current moment; and determining that the first pixels are the bright pixels in a case that the duration is greater than or equal to a designated duration.

In some embodiments, determining whether the bright pixels are the target pixels includes: determining a proportion value of the bright pixels in the corner area;

- determining whether an image displayed in the display region is a static image in response to the proportion value falling within a target proportion range; and
- determining that the bright pixels are the target pixels in response to the image displayed in the display region being not the static image.

In some embodiments, detecting whether target pixels are present in the display region includes:

- determining whether an image displayed in the display region is a static image;
- determining whether the bright pixels are present in a corner area of the display region in response to the image displayed in the display region being not the static image;
- determining a proportion value of the bright pixels in the corner area in response to the bright pixels being present in the display region; and
- determining that the bright pixels in the corner area are the target pixels in response to the proportion value falling within a target proportion range.

In some embodiments, the method further includes:

- reducing brightness of the display region as a whole in response to the image displayed in the display region being the static image.

In some embodiments, after reducing the brightness of the target pixels, the method further includes:

- determining whether an image displayed in the display region is a static image; and
- reducing brightness of the display region as a whole in response to the image displayed in the display region being the static image.

In some embodiments, determining whether the image displayed in the display region is the static image includes:

- acquiring first brightness data for a current frame set of the display device, wherein the current frame set is a set at least including a current frame;
- acquiring second brightness data for a history frame set of the display device, wherein the history frame set is a set at least including a frame preceding the current frame; and
- determining that the image displayed in the display region is the static image in response to a difference between the first brightness data and the second brightness data being less than a specified brightness threshold.

In some embodiments, after acquiring the second brightness data for the history frame set of the display device, the method further includes:

- determining the specified brightness threshold based on the second brightness data,
- wherein the specified brightness threshold is a product of the second brightness data and a target proportion range.

In some embodiments, reducing the brightness of the target pixels includes:

- acquiring brightness data for the target pixels at the designated time period;
- determining an attenuation factor corresponding to the brightness data in a predetermined look-up table based on the brightness data, wherein the look-up table includes a plurality of brightness data and attenuation factors corresponding to each of the brightness data;
- determining an attenuated brightness of the target pixels based on a predetermined formula, wherein the predetermined formula includes $e=d*a*b$, e represents the attenuated brightness, d represents current brightness of the target pixels, a represents the attenuation factor, and b represents the brightness data for the target pixels at the designated time period; and
- reducing the current brightness of the target pixels to the attenuated brightness.

In some embodiments, acquiring the brightness data for the target pixels at the designated time period includes:

- acquiring brightness of the target pixels in each of frames during the designated time period; and
- determining the brightness data based on the brightness of the target pixels in each of frames.

According to some embodiments of the present disclosure, a display device is provided. The display device includes a processor and a memory storing at least one instruction, at least one program segment, a code set, or an instruction set therein, wherein the processor, when loading and executing the at least one instruction, the at least one program segment, the code set, or the instruction set, is caused to perform the display control method as described above.

According to some embodiments of the present disclosure, a non-transitory computer storage medium is provided. The computer storage medium stores at least one instruction, at least one program segment, a code set, or an instruction set therein, wherein the at least one instruction, the at least one program segment, the code set, or the instruction set, when loaded and executed by a processor, causes the process to perform the display control method as described above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

The foregoing drawings illustrate certain embodiments of the application and are hereinafter described in greater detail. The drawings and written description are not intended to limit the scope of the present disclosure in any manner, but rather to illustrate the inventive concepts to those skilled in the art by reference to specific embodiments.

DETAILED DESCRIPTION

To make the objective, technical solutions, and advantages of the present disclosure clearer, embodiments of the present disclosure will be further described in detail with reference to the accompanying drawings.

A display device is capable of realizing a display function, and is controlled to display by a display control method.

However, there may be some areas in the display region of the display device in which images with high brightness display for a long time when the display device is displaying based on display data, such as various logos. These logos with high brightness may be displayed at a certain location in the display region for a long time, which increases the risk of damage to the pixels used to display these logos in the display region, especially for organic light-emitting diode (OLED) display panels, the risk is significantly increased, leading to the issue of "burn-in", which seriously affects the display effect of the display device, thereby reducing the user experience.

Embodiments of the present disclosure provide a display device, a display control method, and a non-transitory computer storage medium, which solves some of the problems in the above-related art.

Figure 1:
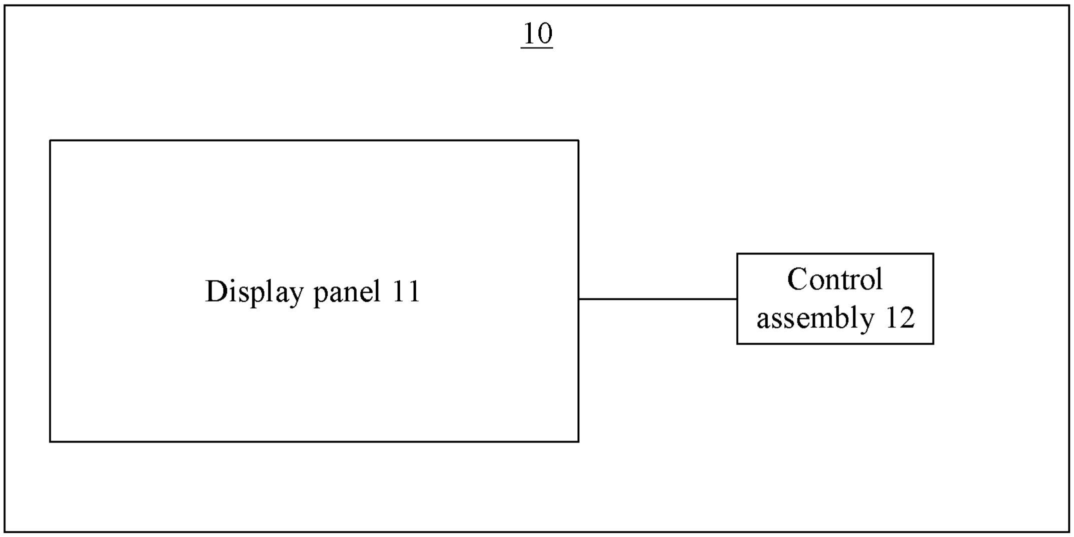
FIG. 1 is a schematic structural diagram of a display device according to some embodiments of the present disclosure.

FIG. 1 is a schematic structural diagram of a display device according to some embodiments of the present disclosure. The display device 10 includes a display panel 11 and a control assembly 12, and the control assembly 12 is electrically connected to the display panel 11.

The display panel 11 is an OLED display panel or a liquid crystal display (LCD) panel. The display panel 11 is provided with a display region which is used to display an image.

The control assembly 12 is used to control the display panel 11 for display.

The display device 10 may be a smartphone, a tablet computer, a laptop computer, a desktop computer, or the like.

Figure 2:
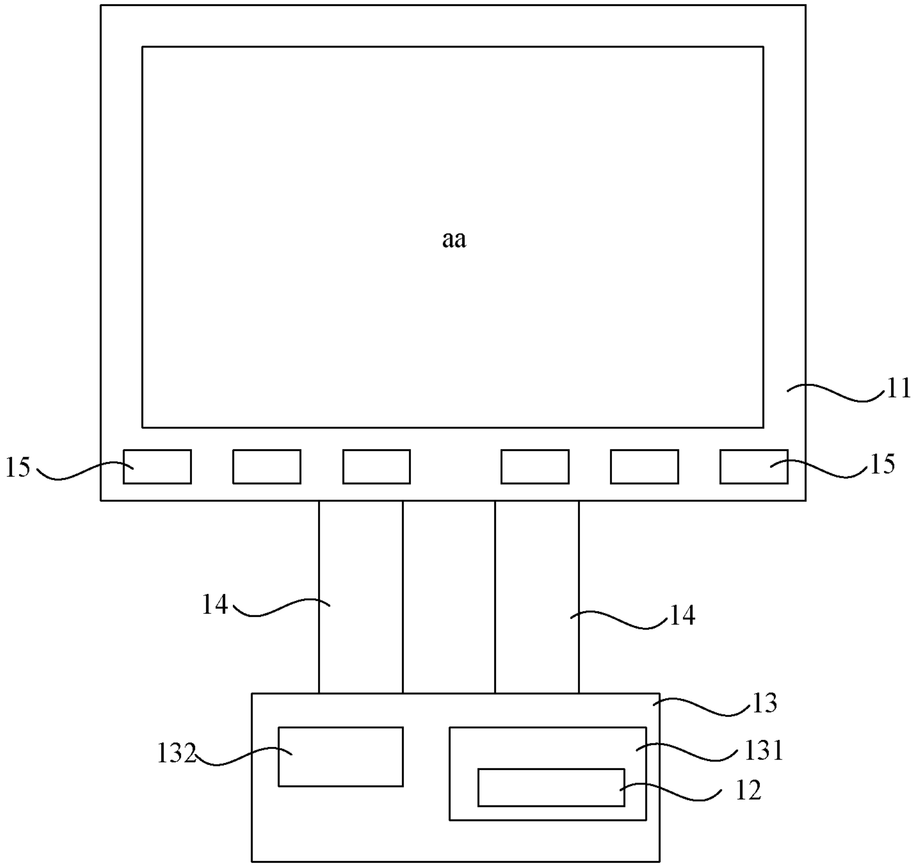
FIG. 2 is a schematic structural diagram of another display device according to some embodiments of the present disclosure.

FIG. 2 is a schematic structural diagram of another display device according to some embodiments of the present disclosure, which is based on the display device shown in FIG. 1 with some adjustments. The display device further includes a first circuit board 13, a connecting circuit board 14, and multiple source drivers (Source ICs) 15. The first circuit board 13 includes structures such as a timing controller (TCON) 131 and a power management integrated circuit (PMIC) 132, and the first circuit board 13 is connected to the display panel 11 via the connecting circuit board 14. The multiple source driver 15 is connected to the display panel 11 and is located, for example, in a peripheral region outside the display region aa. The connecting circuit board 14 includes a flexible printed circuit board (FPC). The control assembly 12 in the display device provided in the embodiments of the present disclosure is provided partially or wholly in combination with the source pole driver 15, alternatively, may be provided partially or wholly in combination with the timing controller 131. FIG. 2 illustrates a structure in which the control assembly 12 is provided in the timing controller 131, but the embodiments of the present disclosure are not limited thereto.

Figure 3:
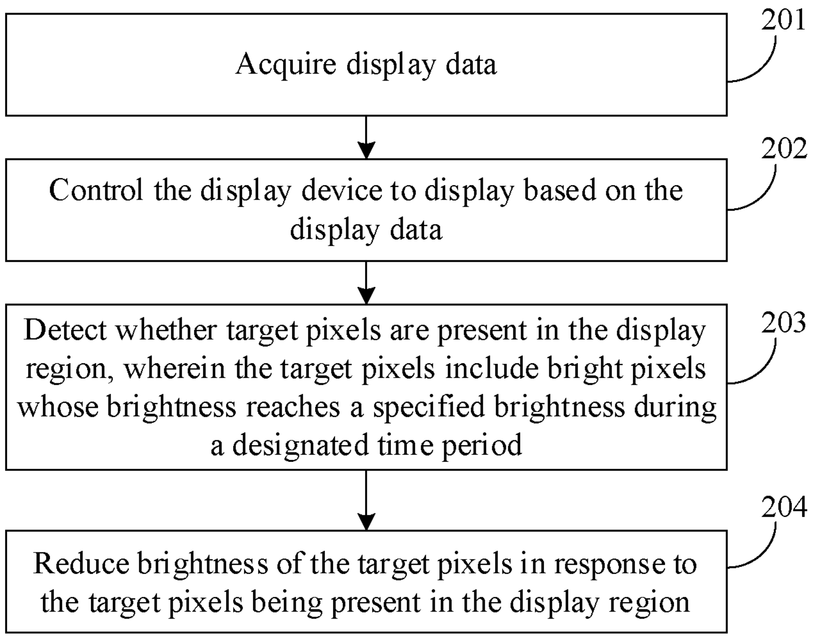
FIG. 3 is a method flowchart of a display control method according to some embodiments of the present disclosure.

FIG. 3 is a method flowchart of a display control method according to some embodiments of the present disclosure. The method is applicable to the display device in the implementation environment shown in FIG. 1 and includes the following steps.

In step 201, display data is acquired.

In step 202, the display device is controlled to display based on the display data.

In step 203, whether target pixels are present in the display region is detected. The target pixels include bright pixels whose brightness reaches a specified brightness during a designated time period.

In step 204, brightness of the target pixels is reduced in response to the target pixels being present in the display region.

The display data may be acquired by the display device from an external device or generated by the display device itself, which is not limited by the embodiments of the present disclosure. The display data may include various data such as image data, video data, and the like.

The display device may detect the presence or absence of the target pixels when displaying based on the display data.

In summary, according to the display control method provided by embodiments of the present disclosure, whether target pixels are present in the display region is detected, the target pixels include bright pixels whose brightness reaches a specified brightness during a designated time period; and brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

Figure 4:
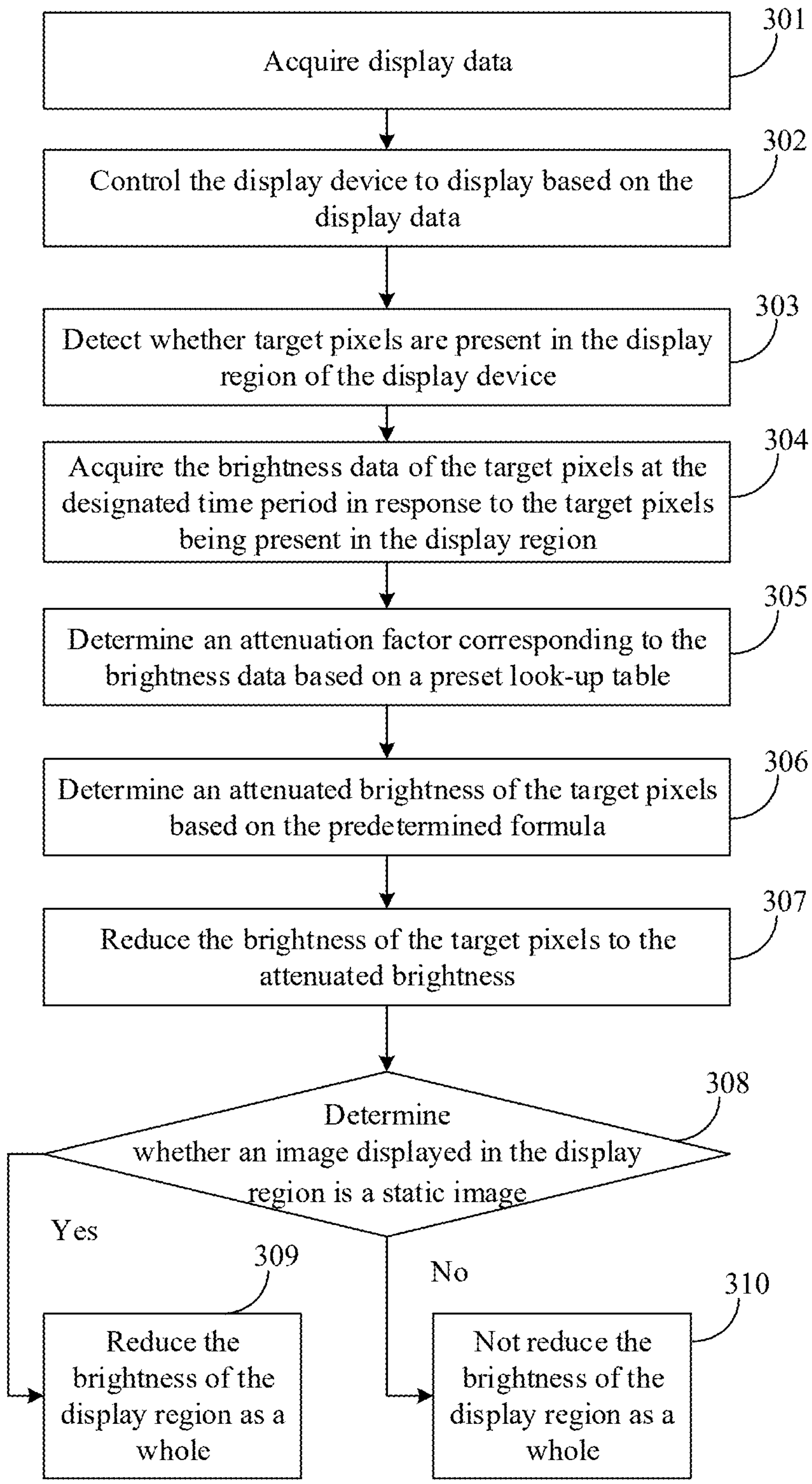
FIG. 4 is a method flowchart of another display control method according to some embodiments of the present disclosure.

FIG. 4 is a method flowchart of another display control method according to some embodiments of the present disclosure. The method is applicable to the display device in the implementation environment shown in FIG. 1 or FIG. 2, and includes the following steps.

In step 301, display data is acquired.

In the display control method provided by embodiments of the present disclosure, the display device acquires display data, and the display data may include various data such as image data, video data, or the like.

The display data may be acquired by the display device from an external device or generated by the display device itself, which is not limited by the embodiments of the present disclosure.

The display control method provided by embodiments of the present disclosure is applicable to a control assembly in the display device, i.e., the control assembly acquires the display data.

In some embodiments, the display data is provided by a content provider, and the display data includes a logo of the content provider. It should be noted that, the content provider may not be a direct provider of the display data, but a provider of the content included in the display data. For example, if the display data is an interview program provided by a certain TV station, the TV station is considered to be the content provider of the display data, or if the display data is video data published on a certain website, the website is the content provider of the display data.

In step 302, the display device is controlled to display based on the display data.

After acquiring the display data, the display device is controlled to display based on the display data.

Figure 5:
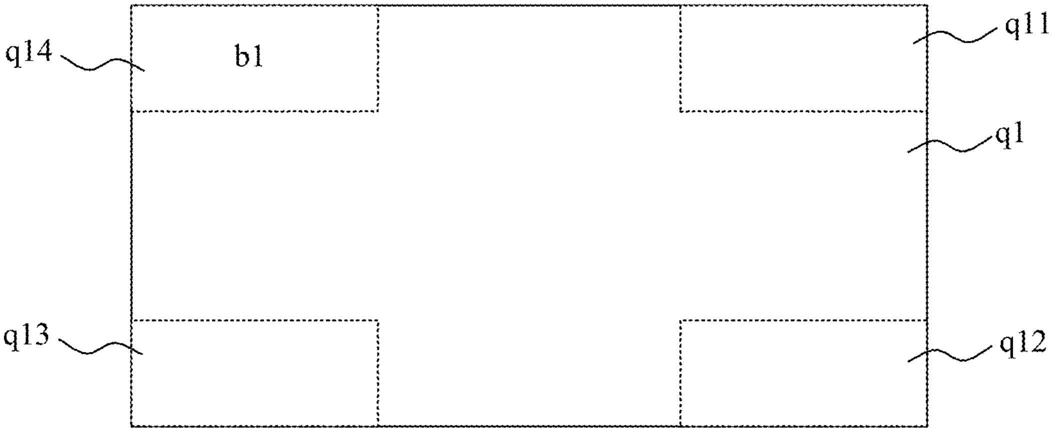
FIG. 5 is a schematic diagram of an image displayed in a display region of the display device according to some embodiments of the present disclosure.

Exemplarily, FIG. 5 is a schematic diagram of an image displayed in a display region of the display device according to some embodiments of the present disclosure, an image and a logo bl of a content provider of the image are displayed in the display region q1. In the case that the content provider is a television station, the logo bl is a station icon of the television station, and in the case that the content provider is a website, the logo bl is a website icon.

In step 303, whether target pixels are present in the display region of the display device is detected.

In some embodiments, when displaying based on the display data, the display device detects the presence of the target pixels in at least one corner area of the display region of the display device, the corner area is an area including vertices of the display region. Exemplarily, in the case that the display region is rectangular, the areas including four vertices of the rectangle respectively are the four corner areas.

As shown in FIG. 5, the corner area in the display region includes a corner area q11, a corner area q12, a corner area q13, and a corner area q14 in the display region shown in FIG. 5.

In the case that the display device displays, the logo of the content provider of the displayed data is displayed in a corner area of the display region of the display device for a long period of time, and the brightness of the logo of the content provider is higher. As a result, there is a high risk of "burn-in" in the corner area where the content provider's logo is located. Considering such a situation, the display control method provided by the embodiments of the present disclosure is used to reduce the brightness of the pixels for displaying the logo, so as to reduce the abnormal display of the pixels.

Specifically, in step 303, the presence or absence of the target pixels may be detected in at least one corner area of the display region. Compared to the solution of detecting the presence or absence of the target pixels in the entire display region, the present disclosure reduces the scope of detection, thereby improving the detection speed and reducing the calculation amount.

Figure 6:
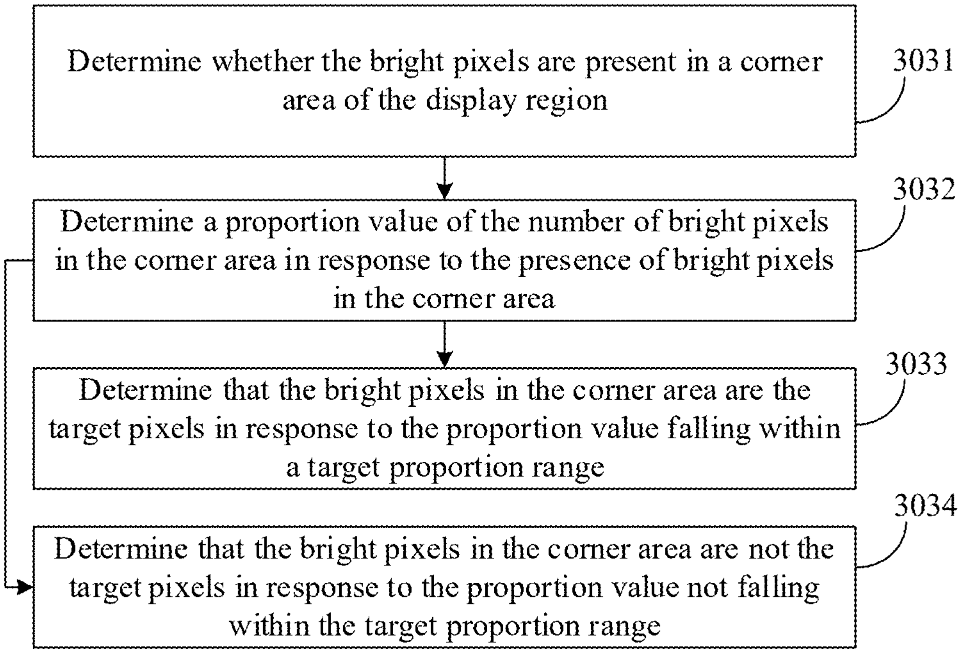
FIG. 6 is a flowchart for detecting the presence of target pixels in the embodiments shown in FIG. 4.

In embodiments of the present disclosure, the presence or absence of target pixels in a corner area may be detected in various ways. Exemplarily, FIG. 6 is a flowchart for detecting the presence of target pixels in the embodiments shown in FIG. 4. Referring to FIG. 6, the step 303 includes the following steps.

In sub-step 3031, whether the bright pixels are present in a corner area of the display region is determined.

The corner area is any one of multiple corner areas in the display region. The size of the corner area may be pre-set. In some embodiment, sizes of multiple logos in the display region are acquired and the size of the corner area is determined based on the area occupied by the logo with the largest size in the display region. Exemplarily, 100 display images (the display images are images displayed in the display region) having different logos are acquired, in which station icon A is the logo with the largest size, the area occupied by the outer graphic of the area occupied by the station icon A in the display image is determined as the corner area. Alternatively, the maximum coordinates of 100 different logos in an x direction and a y direction (the x direction may be the row direction of multiple pixels and the y direction can be the column direction of multiple pixels) are acquired, the two maximum coordinates are used to determine the corner area.

The display device may determine whether there are bright pixels during the designated time period in the corner area of the display region. The bright pixels are pixels whose brightness reaches the specified brightness during the designated time period, the designated time period is prior to the current moment. Exemplarily, the designated time period is a time period between the current moment and 5 minutes prior to the current moment. In addition, the pixel involved in the embodiments of the present disclosure may refer to a light-emitting unit in the display device. The display device includes multiple pixels arranged in rows and columns, the region where the plurality of pixels arranged in rows and columns are located constitutes a display region of the display device. Multiple pixels are capable of displaying different images by displaying different colors as well as different variations of lightness and darkness, so as to enable the display device to display various images. In addition, the pixel may refer to a pixel for displaying a certain color in the display device, which includes multiple sub-pixels, or the pixel may also refer to sub-pixels, which include a blue sub-pixel, a green sub-pixel, a red sub-pixel, a white sub-pixel, and the like.

In embodiments of the present disclosure, the display device determines, in a variety of ways, whether the brightness of the pixels in the corner area reaches the specified brightness during the designated time period.

Exemplarily, the display device determines the pixels with the brightness always greater than or equal to the specified brightness during the designated time period as the bright pixels, or the display device determines the pixels with the average brightness greater than the specified brightness during the designated time period as the bright pixels, or the display device determines the pixels whose brightness is greater than the specified brightness for a specified duration during the designated time period (the specified duration may be 1/n of the designated time period, such as ½ to ⅒) as the bright pixels. Alternatively, the display device may determine the bright pixels in combination with the three judgment conditions, for example, pixels that satisfy at least two of the above-described three judgment conditions are determined as bright pixels.

The specified brightness may be determined based on the attributes of the display device. Exemplarily, an aging test is performed on the display device in advance (pixels may be considered to be significantly aging when the pixels appear residual shadow) to test at which brightness the pixels in the display device is aging faster, and the brightness is determined to be the specified brightness. In embodiments of the present disclosure, the brightness is expressed in terms of a grayscale, which may be recorded in the display data acquired by the display device. Exemplarily, the pixels in the display device age faster at the grayscale of 200, the 200 grayscale is determined as the specified brightness. The specified brightness may also be determined in other ways, which is not limited by the embodiments of the present disclosure.

In general, the bright pixels are pixels with the high brightness during the designated time period, as the bright pixels age faster, it is easy to produce color difference and brightness difference with other adjacent pixels.

Alternatively, the brightness involved in the embodiments of the present disclosure may be the brightness of the light beam actually emitted by the pixels, which may be measured in nits. The brightness may be obtained by setting a sensor outside the display device.

In sub-step 3032, in response to the presence of bright pixels in the corner area, a proportion value of the number of bright pixels in the corner area is determined.

The display device may obtain a proportion value of the number of bright pixels in the corner area in response to the bright pixels being present in the corner area. Exemplarily, the corner area includes 1000 pixels, and the number of bright pixels in the corner area is 500, then the proportion value is one-half.

In sub-step 3033, the bright pixels in the corner area is determined to be the target pixels in response to the proportion value falling within a target proportion range.

In the embodiments of the present disclosure, the target pixels are considered as pixels in the display region for displaying the logo, and the display device will attenuate the brightness of the target pixels. As the proportion occupied by the logo in the corner area is in a certain proportion range, which is not too large or too small. On this basis, the display device may determine the bright pixels in the corner area to be the target pixels in the case that the proportion value determined by the above step is in the target proportion range.

This avoids identifying some pixels that are not in the logo as the target pixels.

In sub-step 3034, the bright pixels in the corner area are not determined to be the target pixels in response to the proportion value not falling within the target proportion range.

In the case that the proportion value is less than the minimum value of the target proportion range, it indicates that there are only a few scattered bright pixels in the corner area, which has a small impact, and these bright pixels are not determined as the target pixels; in the case that the proportion value is greater than the maximum value of the target proportion range, it indicates that there are a large number of bright pixels in the corner area, which may be the contents of the normal display in the display data rather than the logo, and these bright pixels are not determined as the target pixels to avoid affecting the normal display.

Figure 7:
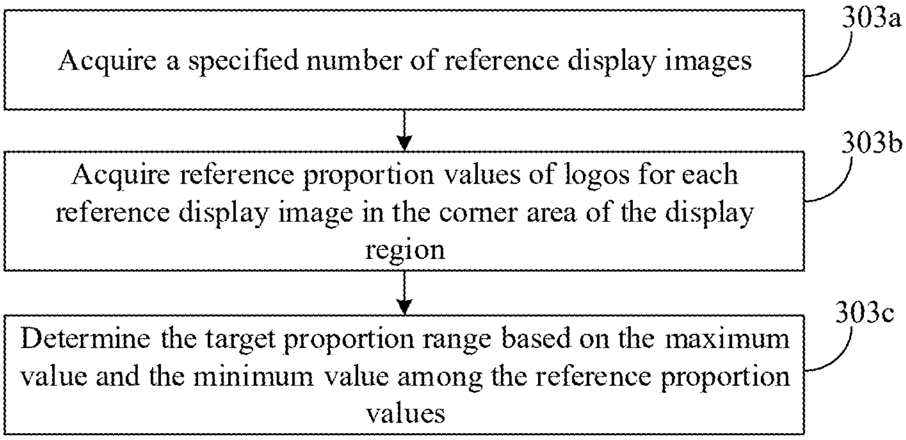
FIG. 7 is a flowchart for determining a target proportion range in the embodiments shown in FIG. 4.

In the display control method provided by embodiments of the present disclosure, the target proportion range may be determined in a variety of ways. In some embodiments, FIG. 7 is a flowchart for determining a target proportion range in the embodiments shown in FIG. 4. Referring to FIG. 7, prior to sub-step 3033, the display control method provided by the embodiments of the present disclosure may include the following steps.

In step 303*a*, a specified number of reference display images are acquired.

The steps 303*a* to 303*c* of determining the target proportion range may be performed by a proportion range determining device. The proportion range determining device is a stand-alone device such as a computer, a server, or the display device involved in the above embodiments, which is not limited by the embodiments of the present disclosure.

Each reference display image includes a logo of the content provider of the reference display image. The specified number of reference display images may be screenshots of display data provided by multiple different content providers during display, the screenshots may include images of the actual display content at a certain moment, such as images in a funny video, a movie, or a variety show, and logos located in the corner area of the images.

The specified number is preset, such as from 20 to 100, specifically, it may be 20, 40, 50, 60, 70, 80, 90, 100. The specified number of reference display images may include screenshots of the display data of the current major content providers, such as the major television stations, major video platforms, etc.

In step 303*b*, reference proportion values of logos for each reference display image in the corner area of the display region is acquired.

The proportion range determining device may separately determine, for each of the specified number of reference display images, a reference proportion value of a logo in the corner area of the display region.

In determining the reference proportion value, the proportion range determining device may first obtain an area in which the logo is located in each reference display image. The reference proportion value is thereafter determined based on a ratio of the dimension of the area to the dimension of the corner area.

The proportion range determining device may determine an area in the reference display image where the logo is located in a variety of ways.

In one embodiment, the proportion range determining device may identify the area where the logo is located in the reference display image by means of image recognition technology. Specifically, it may first obtain the logos of multiple content providers (which may include major content providers, such as the major television stations, major video platforms, etc.), then look for graphics matching the shapes of these logos in the reference display image, and determine the area where the matched graphic is located as the area where the logo is located in the reference display image.

In another embodiment, the area where the logo is located is manually labeled in the reference display image.

In step 303*c*, the target proportion range is determined based on the maximum value and the minimum value among the reference proportion values.

The proportion range determining device may determine the target proportion range based on the maximum value and the minimum value among the reference proportion values of multiple reference display images determined by the above steps. Exemplarily, the maximum value among the reference proportion values is determined as the maximum value of the target proportion range, and the minimum value among the reference proportion values is determined as the minimum value of the target proportion range. Alternatively, the proportion range determining device may multiply the maximum value of the reference proportion values by a predetermined coefficient (e.g., 1.1 to 1.5) to obtain the maximum value of the target proportionality range, and multiply the minimum value of the plurality of reference proportion values by a predetermined coefficient (e.g., 1.1 to 1.5) to obtain the minimum value of the target proportionality range.

It should be noted that, steps 303*a* to 303*c* are only limited to be executed before sub-step 3033, but no other limitations are placed on the moment of execution of steps 303*a* to 303*c*, and steps 303*a* to 303*c* may not be part of step 303. Exemplarily, steps 303*a* to 303*c* are performed prior to steps 301, 302, or 303, or performed after step 301 or step 302. Alternatively, steps 303*a* to 303*c* may be performed at the same time as step 301, or performed at the same time as step 302.

The display device may continue to perform step 303 in the case that the target pixels are not present in the display region.

In step 304, the brightness data of the target pixels at the designated time period is acquired in response to the target pixels being present in the display region.

In the case that the target pixels are present in the display region, the display device acquires brightness data for each target pixel in the designated time period. The brightness data reflects the overall brightness of the target pixels in the designated time period.

The process of acquiring the brightness data by the display device may include the following steps.

1) The brightness of the target pixels for each frame in the designated time period is acquired.

The display device may first acquire the brightness of the target pixels in each frame during the designated time period. Exemplarily, if the designated time period is 100 seconds and the frame rate is 20 frames per second, the display device may acquire 2000 brightness for 2000 frames during these 100 seconds. The brightness may be a grayscale, e.g., 2000 brightness values are 2000 grayscales.

In order to reduce the computation amount, the display device may also acquire less brightness, for example, the brightness of partial frame (e.g., 1 frame) may be taken from multiple frames per second.

2) The brightness data is determined based on the brightness of each frame.

The display device determines the brightness data based on the brightness of each frame in the designated time period. Exemplarily, an average value of the brightness of the plurality of frames may be used as the brightness data, the average value may be an arithmetic average, a geometric average, a squared average, and a weighted average. The display device may also select some (e.g., randomly, or, based on a predetermined rule) brightness from the brightness of frames in the designated time period to determine the brightness data, which is not limited by the embodiments of the present disclosure.

The brightness data may be grayscale.

In step 305, an attenuation factor corresponding to the brightness data is determined based on a preset look-up table.

The look-up table includes multiple brightness data, and attenuation factors corresponding to each of the multiple brightness data. Since the brightness data may be grayscale, the look-up table may record a correspondence between multiple grayscales and the attenuation factors.

The look-up table may be determined in advance by testing. Exemplarily, the aging and residual image speed of pixels at each gray level is acquired by testing, and then the attenuation factor corresponding to each grayscale is determined. For example, the higher the grayscale, the faster the aging and residual image speed of pixels, and the larger the corresponding attenuation factor may be, that is, the grayscale is positively correlated with the attenuation factor.

Alternatively, the correspondence may be expressed as a brightness attenuation curve, which may be disposed in a rectangular coordinate system in which the x-axis represent the grayscale and the y-axis represent the attenuation factor.

In the method provided by embodiments of the present disclosure, each display device may have a corresponding look-up table, or the display devices in the same batch may have a corresponding look-up table, or all display devices correspond to a single look-up table, which is not limited by the embodiments of the present disclosure. When multiple display devices correspond to one look-up table, the aging and the residual image speed of pixels in multiple display devices at each gray level can be combined to determine the attenuation factor corresponding to each gray level.

In step 306, an attenuated brightness of the target pixels is determined based on the predetermined formula.

After acquiring the brightness data that reflects the overall brightness of the target pixels in the designated time period and the attenuation factor corresponding to the brightness data, the display device may determine an attenuated brightness of the target pixels based on the brightness data, the attenuation factor, and the predetermined formula. The predetermined formula includes: $e=d*a*b$; wherein e represents the attenuated brightness, d represents the current brightness of the target pixels, that is, the brightness of the target pixels before reducing, b represents the brightness data of the target pixels at the designated time period obtained by the above step, and a represents the attenuation factor corresponding to b.

The display device may also determine the attenuated brightness in other ways, for example, any grayscale is reduced by a fixed difference, and if the grayscale of a pixel is less than the difference, the grayscale of the pixel may be reduced to zero.

In step 307, the brightness of the target pixels is reduced to the attenuated brightness.

After determining the attenuated brightness of the target pixels, the display device reduces the brightness of the target pixels to the attenuated brightness. In this way, the brightness of the target pixels is reduced, which avoids the rapid aging and residual image of the target pixels at high brightness for a long time, thereby improving the life of the target pixels and improving the display effect of the display device.

The display device may control the brightness of each of the target pixels determined by the method provided by embodiments of the present disclosure.

Subsequent steps are optional.

In step 308, whether the image displayed in the display region is a static image is determined. If it is a static image, perform step 309. If it is not the static image, perform step 310.

The display device may further determine whether the image displayed in the display region is the static image.

Exemplarily, the display device may compare the brightness data of each frame, and determine that the image displayed in the display region is the static image in the case that the brightness data is close, and determine that the image displayed in the display region is not the static image in the case that the brightness data is not close.

In step 309, the brightness of the display region is reduced as a whole.

In response to the fact that the image displayed in the display region is the static image, the display device may further reduce the brightness of the display region as a whole, to eliminate the area sense produced when the brightness of the target pixels is reduced individually, thereby enhancing the user experience.

In step 310, the brightness of the display region is not reduced as a whole.

In response to the fact that the image displayed in the display region is not the static image, the display device may not reduce the brightness of the display region as a whole.

In summary, according to the display control method provided by embodiments of the present disclosure, whether target pixels are present in the display region is detected, the target pixels include bright pixels whose brightness reaches a specified brightness during a designated time period; and the brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

Figure 8:
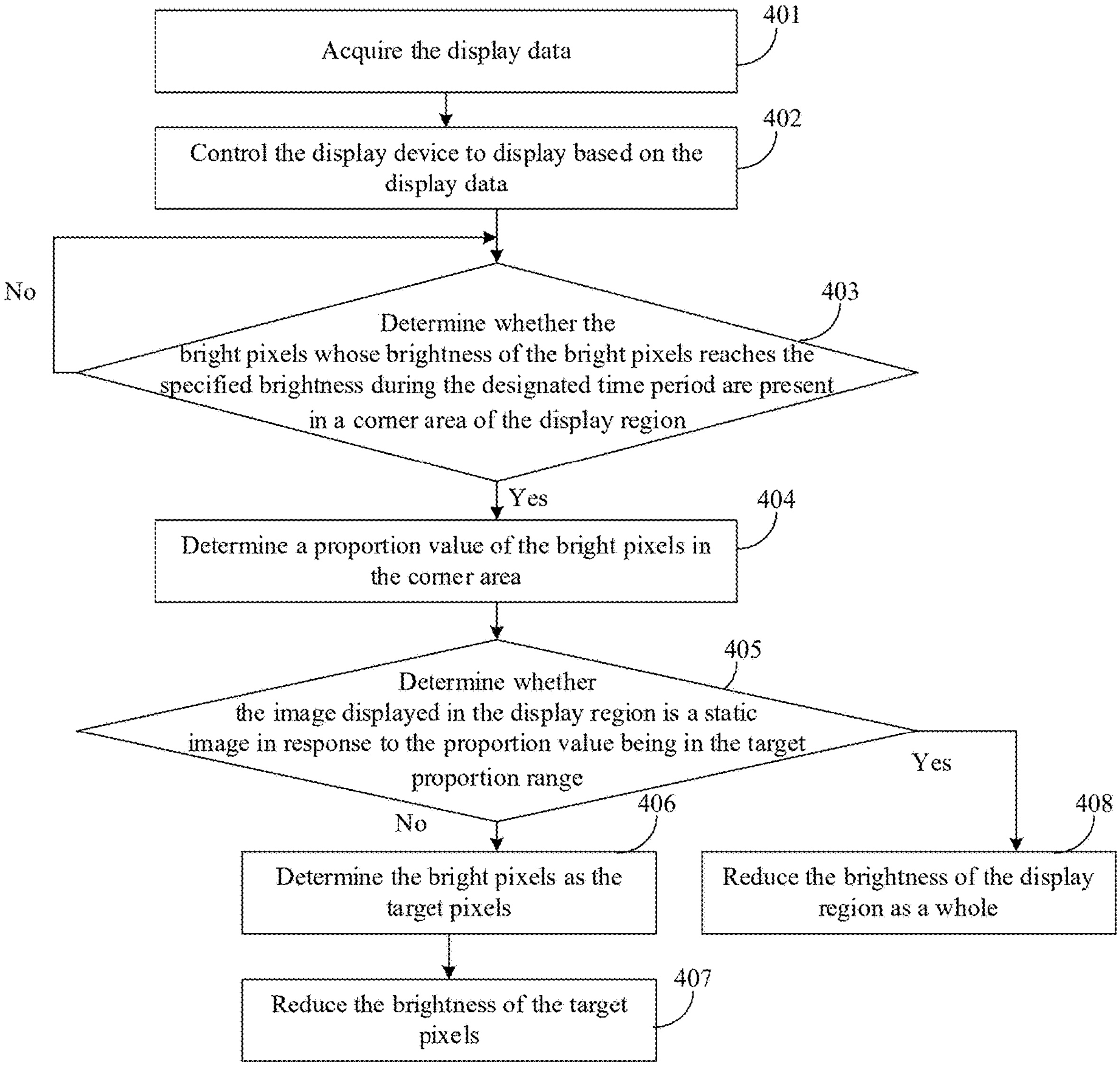
FIG. 8 is a flowchart of another display control method according to some embodiments of the present disclosure.

FIG. 8 is a flowchart of another display control method according to some embodiments of the present disclosure, which is applicable to the display device shown in FIG. 1 or FIG. 2, the method includes the following steps.

In step 401, the display data is inquired.

In the display control method provided by embodiments of the present disclosure, the display device acquires display data, which may include various data such as image data, video data, and the like.

The display data may be acquired by the display device from an external device or generated by the display device itself, which is not limited by the embodiments of the present disclosure.

The display control method provided by embodiments of the present disclosure is applicable to a control assembly in the display device, i.e., the control assembly acquires the display data.

In some embodiments, the display data is provided by a content provider, and the display data includes a logo of the content provider. It should be noted that, the content provider may not be a direct provider of the display data, but a provider of the content included in the display data. For example, if the display data is an interview program provided by a certain TV station, the TV station is considered to be the content provider of the display data, or if the display data is video data published on a certain website, the website is the content provider of the display data.

In step 402, the display device is controlled to display based on the display data.

After acquiring the display data, the display device is controlled to display based on the display data.

This step can be referred to as step 302 in the embodiment shown in FIG. 4, which is not repeated here in the present disclosure.

In step 403, whether the bright pixels whose brightness of the bright pixels reaches the specified brightness during the designated time period are present in a corner area of the display region is determined. When the bright pixels are present in the corner area, step 404 is performed, and when the bright pixels are not present in the corner area, step 403 is performed.

In some embodiments of the present disclosure, the display device may first detect the presence of bright pixels in the corner area of the display region. The bright pixels may be pixels whose brightness reaches the specified brightness during the designated time period. The designated time period may be prior to the current moment, and the corner area is an area including vertices of the display region. Exemplarily, when the display region is rectangular, the areas including four vertices of the rectangle respectively are the four corner areas.

When the bright pixels are present, the display device may continue to perform the subsequent steps, and when the bright pixels are not present, the display device may continue to perform step 403 to continue to detect the presence of the bright pixels in the subsequent display data.

The display device may detect the presence of bright pixels in a variety of ways.

The First Option

1) The average brightness of first pixels in the corner area is acquired during the designated time period, the designated time period is prior to the current moment.

The first pixels may be any pixels in the corner area, and the display device may acquire the brightness of the first pixels in each frame during the designated time period and take an average value of the brightness of the frame as the average brightness. The average value may be an arithmetic average, a geometric average, a squared average, a weighted average, etc.

2) The first pixels are determined as the bright pixels in the case that the average brightness is greater than or equal to the specified brightness.

The display device may determine the first pixels as the bright pixels in the case that the average brightness determined in the above step is greater than or equal to the specified brightness. The specified brightness may be determined based on the attributes of the display device. Exemplarily, an aging test is performed on the display device in advance (pixels may be considered to be significantly aging when the pixels appear residual shadow) to test at which brightness the pixels in the display device are aging faster, and the brightness is determined to be the specified brightness. In embodiments of the present disclosure, the brightness is expressed in terms of a grayscale.

Since the average brightness can more accurately reflect the comprehensive brightness of the first pixels during the designated time period, the scheme of determining the bright pixels by the average brightness can improve the accuracy when determining the bright pixels by the method provided by some embodiments of the present disclosure.

Second Option

1) Minimum brightness of the first pixels in the corner area is acquired during the designated time period.

In this manner, the display device acquires the minimum brightness of the first pixels in the corner area during the designated time period.

2) The first pixels are determined as the bright pixels when the minimum brightness is greater than or equal to the specified brightness.

The display device determines the first pixels as the bright pixels when the minimum brightness is greater than or equal to the specified brightness. Exemplarily, if the display device determines that the first pixels have the minimum brightness of 210 gray levels during the designated time period, and the specified brightness is 200 gray levels, it is determined that the first pixels are bright pixels.

Since the brightness of the logo typically does not change, the method of determining the bright pixels based on the minimum brightness can enhance the accuracy of determining the bright pixels in the method provided by some embodiments of the present disclosure.

Third Option:

1) A duration when the brightness of the first pixels in the corner area is greater than or equal to the specified brightness in the designated time period is acquired.

In the option, the display device determines whether the first pixels are bright pixels based on the duration when the brightness of the first pixels in the corner area is greater than or equal to the specified brightness in the designated time period.

(2) The first pixels are determined to be bright pixels in the case that the duration when the brightness of the first pixels in the corner area is greater than or equal to the specified brightness in the designated time period is greater than or equal to a specified duration.

The display device determines that the first pixels are bright pixels in the case that the duration when the brightness of the first pixels in the corner area is greater than or equal to the specified brightness in the designated time period is greater than or equal to the specified duration. The specified duration may be pre-set. Exemplarily, the specified duration is ½ to ⅕ of the designated time period.

In the option, some pixels whose brightness is much higher than the specified brightness only in some periods of time but lower than the specified brightness in more periods of time are avoided mistakenly identifying as bright pixels, thereby improving the accuracy of determining bright pixels in the method provided by embodiments of the present disclosure.

According to the method provided by embodiments of the present disclosure, whether the first pixels are bright pixels may be determined by at least one of the above three options. Exemplarily, the first pixels are determined to be bright pixels when the first pixels satisfy the requirements in both options.

In addition, the manner of determining bright pixels provided by the embodiments of the present disclosure may also be applied in other embodiments provided by the present disclosure.

In step 404, a proportion value of the number of bright pixels in the corner area is determined.

In response to the bright pixels being present in the corner area, the display device determines the proportion value of the number of bright pixels in the corner area. The step may be referred to as sub-step 3032 in the embodiment shown in FIG. 4, which is not repeated here by the embodiments of the present disclosure.

In step 405, in response to the proportion value being in the target proportion range, whether the image displayed in the display region is a static image is determined. If the image displayed in the display region is the static image, step 406 is performed. If the image displayed in the display region is not the static image, step 408 is performed.

In response to the proportion value being in the target proportional range, the display device determines whether the image displayed in the display region is the static image. In addition, regarding the target proportion range, reference may be made to steps 303*a* to 303*c* in the embodiment shown in FIG. 4 above, which is not repeated here by the embodiments of the present disclosure.

Figure 9:
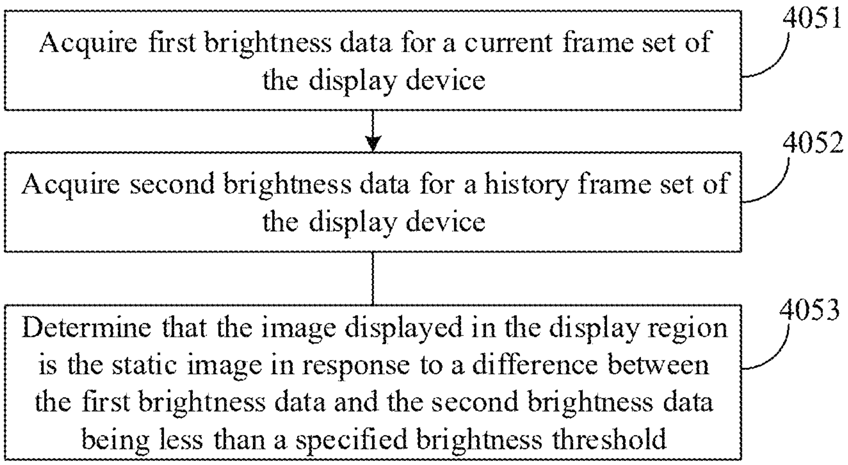
FIG. 9 is a flowchart for determining whether an image displayed in a display region is a static image according to some embodiments of the present disclosure.

As shown in FIG. 9, FIG. 9 is a flowchart for determining whether an image displayed in a display region is a static image according to some embodiments of the present disclosure. The flowchart includes the following sub-steps.

In sub-step 4051, first brightness data for a current frame set of the display device is acquired.

The display device may acquire the first brightness data for the current frame set, the current frame set is a set at least including at least a frame prior to the current frame. The first brightness data is an average of the brightness data of all frames in the current frame set.

In sub-step 4052, second brightness data for a history frame set of the display device is acquired.

The display device acquires the second brightness data of the history frame set of the display device, the history frame set is a set including at least a frame prior to the current frame. The frames included in the history frame set may or may not overlap the frames included in current frame set, which is not limited in the embodiments of the present disclosure. Exemplarily, if the current frame is the nth frame, the current frame set may include the nth frame, the n−1st frame, and the n−2nd frame, and the history frame set may include the n−1st frame, the n−2nd frame, and the n−3rd frame, so as to have an overlap. Alternatively, the history frame set includes the n−3rd frame, the n−4th frame, and the n−5th frame, so as to not have an overlap.

After the second brightness data is acquired, the display device determines a specified brightness threshold based on the second brightness data, the specified brightness threshold being a product of the second brightness data and a target proportion range.

Optionally, the target proportion ranges from $1/64$ to $1/32$.

In sub-step 4053, in response to the difference between the first brightness data and the second brightness data being less than the specified brightness threshold, the image displayed in the display region is determined to be the static image.

The present disclosure's limitation for the static image does not refer to an image that is strictly static, but refers to an image that is substantially static.

It should be noted that the first brightness data, the second brightness data, and the specified brightness threshold may all be represented by a grayscale. Exemplarily, the first brightness data is 200 grayscale, the second brightness data is 210 grayscale, and the specified brightness threshold is 20 grayscale, so that the difference between the first brightness data and the second brightness data is 10, which is less than the specified brightness threshold, and it may be determined that the image displayed in the display region is the static image.

Correspondingly, in response to the difference between the first brightness data and the second brightness data being greater than or equal to the specified brightness threshold, it is determined that the image displayed in the display region is not the static image.

In step 406, the bright pixels are determined as the target pixels.

In response to the fact that the image displayed in the display region is not the static image, the display device may determine the bright pixels as target pixels. That is, in response to the image displayed in the display region not being the static image, the display device may determine only the bright pixels as the target pixels so as to reduce the effect of the brightness attenuation.

In step 407, the brightness of the target pixels is reduced.

In response to the presence of the target pixels in the display region, the display device may reduce the brightness of the target pixels. The manner of reducing the brightness of the target pixels may be referred to in steps 304 to 307 of the embodiment shown in FIG. 4, which is not repeated herein by the embodiments of the present disclosure.

In step 408, the brightness of the display region is reduced as a whole.

In response to the image displayed in the display region being the static image, the display device reduces the brightness of the display region as a whole. Since the display device displays the static image, it does not result in a significant effect on the display effect even if the brightness of the full screen is reduced, and reduces the risk of the abnormality display of the display device.

In summary, according to the display control method provided by embodiments of the present disclosure, whether target pixels are present in the display region is detected, the target pixels include bright pixels whose brightness reaches a specified brightness during a designated time period; and the brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

Figure 10:
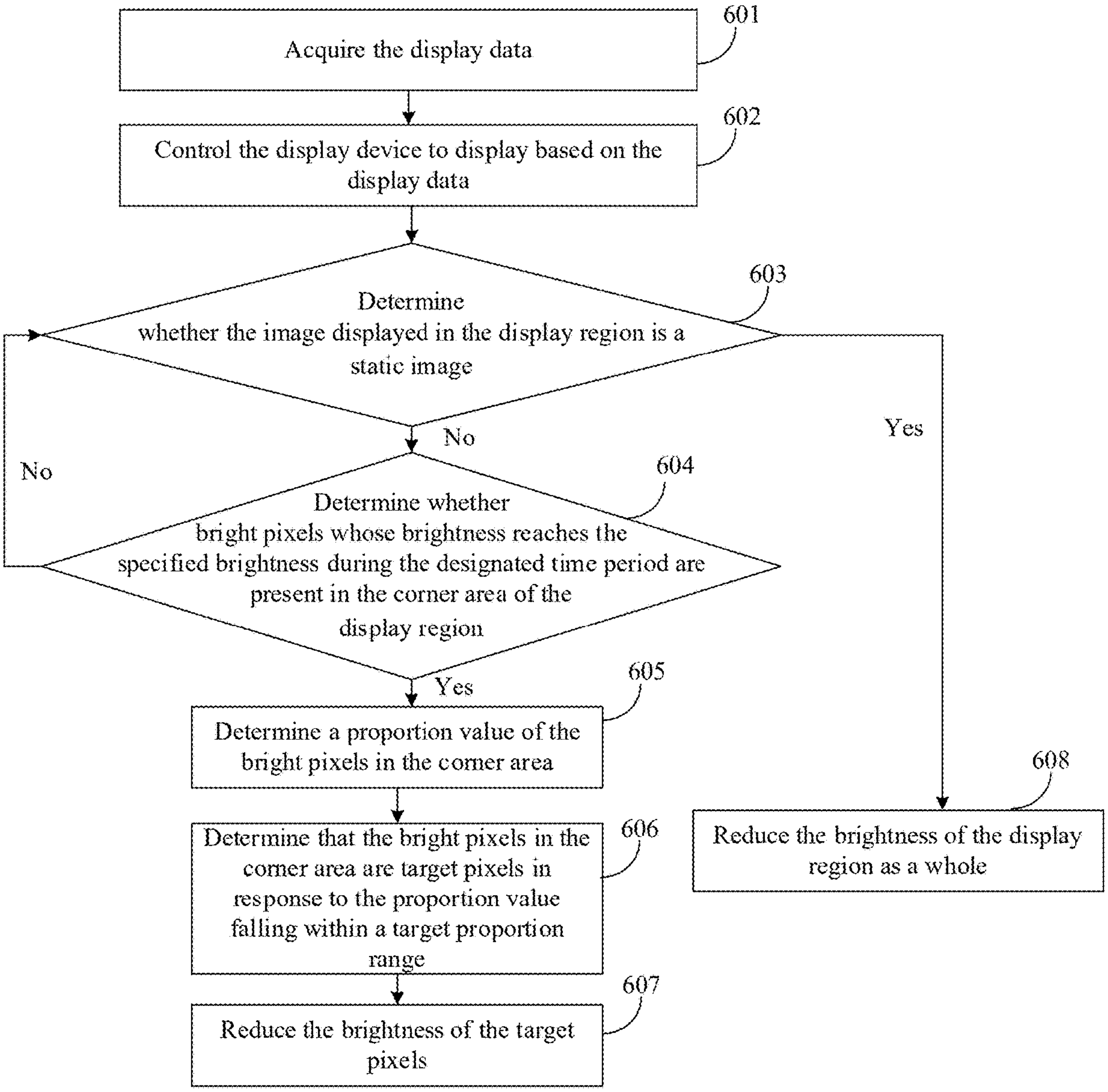
FIG. 10 is a flowchart of another display control method according to some embodiments of the present disclosure.

FIG. 10 is a flowchart of another display control method according to some embodiments of the present disclosure, which is applicable to a control assembly in the display device shown in FIG. 1 or FIG. 2, and the display control method includes the following steps.

In step 601, the display data is acquired.

The step can be referred to as step 701 in the embodiment shown in FIG. 8, which is not repeated here by embodiments of the present disclosure.

In step 602, the display device is controlled to display based on the display data.

The step can be referred to as step 402 in the embodiment shown in FIG. 8, which is not repeated here by embodiments of the present disclosure.

In step 603, whether the image displayed in the display region is a static image is determined. If the image displayed in the display region is not the static image, step 604 is performed, and if the image displayed in the display region is the static image, step 607 is performed.

In the embodiments of the present disclosure, the display device may first determine whether the image displayed in the display region is the static image. For details on how to determine whether the image displayed in the display region is the static image, reference can be made to step 405 in the embodiment shown in FIG. 8 above, which is not repeated here by embodiments of the present disclosure.

In step 604, whether bright pixels are present in the corner area of the display region is determined, the brightness of the bright pixels reaches the specified brightness during the designated time period. If the bright pixels are present, step 605 is performed, if the bright pixels are not present, step 603 is performed.

In response to the image displayed in the display region not being a static image, the display device determines whether the bright pixels are present in the display region whose brightness reaches the specified brightness during the designated time period. The step may be referred to as step 403 in the embodiment shown in FIG. 8 above, which is not repeated here by embodiments of the present disclosure.

In step 605, a proportion value of the number of bright pixels in the corner area is determined.

In response to the bright pixels being present in the corner area, the display device determines the proportion value of the number of bright pixels in the corner area. The step may be referred to as step 403 in the embodiment shown in FIG. 8, which is not repeated here by the embodiments of the present disclosure.

In step 606, in response to the proportion value falling within a target proportion range, the bright pixels in the corner area are determined to be target pixels.

The display device determines that the bright pixels in the corner area are target pixels when the proportion value of the number of bright pixels in the corner area falls within the target proportion range.

In step 607, the brightness of the target pixels is reduced.

The display device reduces the brightness of the pixels identified as the target pixels. The specific manner can be referred to from step 304 to step 307 in the embodiment shown in FIG. 4 above, which is not repeated here by the embodiments of the present disclosure.

In step 608, the brightness of the display region is reduced as a whole.

In response to the image displayed in the display region being the static image, the display device reduces the brightness of the display region as a whole. Since the display device displays the static image, it does not result in a significant effect on the display effect even if the brightness of the full screen is reduced, and reduces the risk of the abnormality display of the display device.

In summary, according to the display control method provided by embodiments of the present disclosure, whether target pixels are present in the display region is detected, the target pixels include bright pixels whose brightness reaches a specified brightness during a designated time period; and the brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

The following are examples of device embodiments of the present disclosure that can be used to perform the method embodiments of the present disclosure. For details not disclosed in the device embodiments of the present disclosure, please refer to the method embodiments of the present disclosure.

In some embodiments, referring to FIG. 1 or FIG. 2, the control assembly 12 in the display device is configured to:

- acquire display data;
- control the display panel 11 to display based on the display data;
- detect whether target pixels are present in the display region, wherein the target pixels include bright pixels whose brightness reaches a specified brightness during a designated time period; and
- reduce the brightness of the target pixels in response to the target pixels being present in the display region.

In summary, according to the display device provided by embodiments of the present disclosure, whether target pixels are present in the display region is detected, the target pixels include bright pixels whose brightness reaches a specified brightness during a designated time period; and the brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

In some embodiments, the control assembly 12 is further configured to:

- determine whether the bright pixels are present in a corner area of the display region; and
- determine whether the bright pixels are the target pixels in response to the bright pixels being present in the corner area.

In some embodiments, the control assembly 12 is further configured to:

- determine a proportion value of the bright pixels in the corner area; and
- determine that the bright pixels in the corner area are the target pixels in response to the proportion value falling within a target proportion range.

In some embodiments, the control assembly 12 is further configured to:

- acquire a specified number of reference display images, wherein each reference display image contains a logo of a content provider of the reference display image;
- acquire reference proportions of the logo in each of the reference display images in the corner area of the display region; and
- determine the target proportion range based on a maximum value and a minimum value among the reference proportions.

In some embodiments, the control assembly 12 is further configured to:

- determine that the bright pixels in the corner area are not the target pixels in response to the proportion value not falling within the target proportion range.

In some embodiments, the control assembly 12 is further configured to:

acquire an average brightness of first pixels in the corner area during the designated time period, wherein the designated time period is a time period prior to a current moment; and determine that the first pixels are the bright pixels in response to the average brightness being greater than or equal to the specified brightness.

In some embodiments, the control assembly 12 is further configured to:

acquire minimum brightness of first pixels in the corner area during the designated time period, wherein the designated time period is a time period prior to a current moment; and determine that the first pixels are the bright pixels in response to the minimum brightness is greater than or equal to the specified brightness.

In some embodiments, the control assembly 12 is further configured to:

acquire a duration when the brightness of first pixels in the corner area is greater than or equal to the specified brightness during the designated time period, wherein the designated time period is a time period prior to a current moment; and determine that the first pixels are the bright pixels in a case that the duration is greater than or equal to a designated duration.

In some embodiments, the control assembly 12 is further configured to:

determine a proportion value of a number of the bright pixels in the corner area;

determine whether an image displayed in the display region is a static image in response to the proportion value falling within a target proportion range; and determine that the bright pixels are the target pixels in response to the image displayed in the display region being not the static image.

In some embodiments, the control assembly 12 is further configured to:

determine whether an image displayed in the display region is a static image;

determine whether the bright pixels are present in a corner area of the display region in response to the image displayed in the display region being not the static image;

determine a proportion value of a number of the bright pixels in the corner area in response to the bright pixels being present in the display region; and determine that the bright pixels in the corner area are the target pixels in response to the proportion value falling within a target proportion range.

In some embodiments, the control assembly 12 is further configured to:

reduce the brightness of the display region as a whole in response to the image displayed in the display region being the static image.

In some embodiments, the control assembly 12 is further configured to:

determine whether an image displayed in the display region is a static image; and reduce the brightness of the display region as a whole in response to the image displayed in the display region being the static image.

In some embodiments, the control assembly 12 is further configured to:

acquire first brightness data for a current frame set of the display device, wherein the current frame set is a set at least including a current frame;

acquire second brightness data for a history frame set of the display device, wherein the history frame set is a set at least including a frame preceding the current frame; and determine that the image displayed in the display region is the static image in response to a difference between the first brightness data and the second brightness data being less than a specified brightness threshold.

In some embodiments, the control assembly 12 is further configured to:

determine the specified brightness threshold based on the second brightness data, wherein the specified brightness threshold is a product of the second brightness data and a target proportion range.

In some embodiments, the control assembly 12 is further configured to:

acquire brightness data for the target pixels at the designated time period;

determine an attenuation factor corresponding to the brightness data in a predetermined look-up table based on the brightness data, wherein the look-up table includes a plurality of brightness data and attenuation factors corresponding to each of the brightness data;

determine an attenuated brightness of the target pixels based on a predetermined formula, wherein the predetermined formula includes $e=d*a*b$, e represents the attenuated brightness, d represents current brightness of the target pixels, a represents the attenuation factor, and b represents the brightness data for the target pixels at the designated time period; and reduce the current brightness of the target pixels to the attenuated brightness.

In some embodiments, the control assembly 12 is further configured to:

acquire brightness of the target pixels in each of frames during the designated time period; and determine the brightness data based on the brightness of the target pixels in each of frames.

Figure 11:
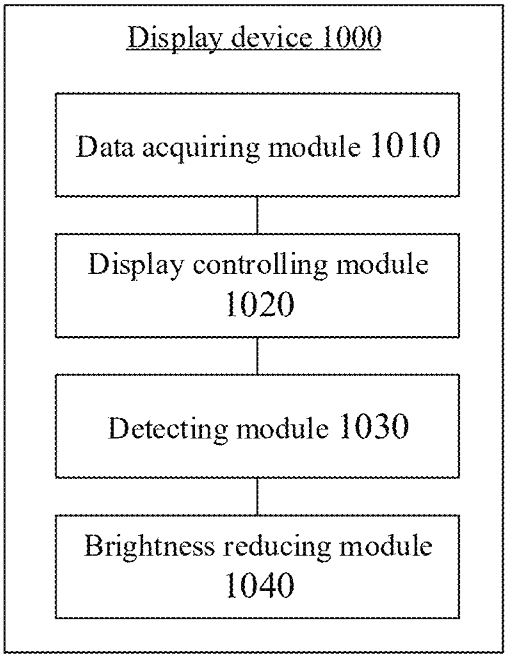
FIG. 11 is a block diagram of a display device according to some embodiments of the present disclosure.

FIG. 11 is a block diagram of a display device according to some embodiments of the present disclosure. The display device 1000 includes the following modules.

a data acquiring module 1010, configured to acquire display data;

a display controlling module 1020, configured to control the display device to display based on the display data;

a detecting module 1030, configured to detect whether target pixels are present in the display region, wherein the target pixels include bright pixels whose brightness reaches a specified brightness during a designated time period; and a brightness reducing module 1040, configured to reduce the brightness of the target pixels in response to the target pixels being present in the display region.

In summary, according to the display device provided by embodiments of the present disclosure, whether target pixels are present in the display region is detected, the target pixels include bright pixels whose brightness reaches a specified brightness during a designated time period; and the brightness of the target pixels is reduced in response to the target pixels being present in the display region. The method avoids the abnormal light of the target pixels due to their long-term high brightness and solves the issue of the high risk of abnormal display of the display device in related art, thereby reducing the risk of abnormal display of the display device.

In some embodiments, the detecting module 1030 further includes:

a bright pixel determining unit, configured to determine whether the bright pixels are present in a corner area of the display region; and a target pixel determining unit, configured to determine whether the bright pixels are the target pixels in response to the bright pixels being present in the corner area.

In some embodiments, the target pixel determining unit is further configured to:

determine a proportion value of the bright pixels in the corner area; and determine that the bright pixels in the corner area are the target pixels in response to the proportion value falling within a target proportion range.

In some embodiments, the display device further includes:

a reference acquiring module, configured to acquire a specified number of reference display images, wherein each of the reference display images contains a logo of a content provider of the reference display image;

a proportion acquiring module, configured to acquire reference proportions of the logo in each of the reference display images in the corner area of the display region; and a range determining module, configured to determine the target proportion range based on a maximum value and a minimum value among the reference proportions.

In some embodiments, the display device further includes:

a target negating module, configured to determine that the bright pixels in the corner area are not the target pixels in response to the proportion value not falling within the target proportion range.

In some embodiments, the bright pixel determining unit is further configured to:

acquire an average brightness of first pixels in the corner area during the designated time period, wherein the designated time period is a time period prior to a current moment; and determine that the first pixels are the bright pixels in response to the average brightness being greater than or equal to the specified brightness.

In some embodiments, the bright pixel determining unit is further configured to:

acquire minimum brightness of first pixels in the corner area during the designated time period, wherein the designated time period is a time period prior to a current moment; and determine that the first pixels are the bright pixels in response to the minimum brightness is greater than or equal to the specified brightness.

In some embodiments, the bright pixel determining unit is further configured to:

acquire a duration when brightness of first pixels in the corner area is greater than or equal to the specified brightness during the designated time period, wherein the designated time period is a time period prior to a current moment; and determine that the first pixels are the bright pixels in a case that the duration is greater than or equal to a designated duration.

In some embodiments, the target pixel determining unit is further configured to:

determine a proportion value of the bright pixels in the corner area;

determine whether an image displayed in the display region is a static image in response to the proportion value falling within a target proportion range; and determine that the bright pixels are the target pixels in response to the image displayed in the display region being not the static image.

In some embodiments, the detecting module 1030 is further configured to:

determine whether an image displayed in the display region is a static image;

determine whether the bright pixels are present in a corner area of the display region in response to the image displayed in the display region being not the static image;

determine a proportion value of the bright pixels in the corner area in response to the bright pixels being present in the display region; and determine that the bright pixels in the corner area are the target pixels in response to the proportion value falling within a target proportion range.

In some embodiments, the display device further includes:

an overall brightness reducing module, configured to reduce brightness of the display region as a whole in response to the image displayed in the display region being the static image.

In some embodiments, the display device further includes:

a static determining module, configured to determine whether an image displayed in the display region is a static image; and an overall brightness reducing module, configured to reduce brightness of the display region as a whole in response to the image displayed in the display region being the static image.

In some embodiments, the static determining module is further configured to:

acquire first brightness data for a current frame set of the display device, wherein the current frame set is a set at least including a current frame;

acquire second brightness data for a history frame set of the display device, wherein the history frame set is a set at least including a frame preceding the current frame; and determine that the image displayed in the display region is the static image in response to a difference between the first brightness data and the second brightness data being less than a specified brightness threshold.

In some embodiments, the display device further includes:

a brightness threshold determining module, configured to determine the specified brightness threshold based on the second brightness data, wherein the specified brightness threshold is a product of the second brightness data and a target proportion range.

In some embodiments, the target proportion range is $\frac{1}{64}$ to $\frac{1}{32}$.

In some embodiments, the brightness reducing module further includes:

a brightness data acquiring unit, configured to acquire brightness data for the target pixels at the designated time period;

an attenuation factor acquiring unit, configured to determine an attenuation factor corresponding to the brightness data in a predetermined look-up table based on the brightness data, wherein the look-up table includes a plurality of brightness data and attenuation factors corresponding to each of the brightness data;

an attenuated brightness determining unit, configured to determine an attenuated brightness of the target pixels based on a predetermined formula, wherein the predetermined formula includes e=d*a*b, e represents the attenuated brightness, d represents current brightness of the target pixels, a represents the attenuation factor, and b represents the brightness data for the target pixels at the designated time period; and a brightness reducing unit, configured to reduce the current brightness of the target pixels to the attenuated brightness.

In some embodiments, the brightness data acquiring unit is further configured to:

acquire brightness of the target pixels in each of frames during the designated time period; and determine the brightness data based on the brightness of the target pixels in each of frames.

According to some embodiments of the present application, a display device is provided. The display device includes a processor and a memory. The memory stores at least one instruction, at least one program segment, a code set, or an instruction set therein. The processor, when loading and executing the at least one instruction, the at least one program segment, the code set, or the instruction set, is caused to perform the display control method described above.

According to some embodiments of the present application, a non-transitory computer storage medium is provided. The computer storage medium has stored at least one instruction, at least one program segment, a code set, or an instruction set therein. The at least one instruction, the at least one program segment, the code set, or the instruction set, when loaded and executed by a processor, causes the process to perform the display control method described above.

According to some embodiments of the present application, a computer program product or computer program is provided. The computer program product or computer program includes computer instructions that are stored in a computer-readable storage medium. The computer instructions, when read and executed by a processor of a computer device, cause the computer device to perform the display control method as described above.

The term "at least one of A and B" in the present application is merely a description of an association relationship of an associated object, and indicates that three relationships exist, for example, at least one of A and B is indicated as: the existence of A alone, the existence of both A and B, and the existence of B alone. Similarly, "at least one of A, B, and C" indicates that seven relationships exist, which are expressed as follows: A alone, B alone, C alone, both A and B, both A and C, both C and B, and both A, B, and C in seven cases. Similarly, "at least one of A, B, C and D" means that fifteen relationships exist, which are expressed as: A alone, B alone, C alone, D alone, both A and B, both A and C, both A and D, both C and B, both D and B, both C and D, both A and B, both A and B, both A and B, both D and C, both C and D, and both A, B and C. A, B and C at the same time, A, B and D at the same time, A, C and D at the same time, B, C and D at the same time, A, B, C and D at the same time, these are the fifteen cases.

In this application, the terms "first", "second", "third" are used for descriptive purposes only and are not to be construed as indicating or implying relative importance. The term "plural" refers to two or more, unless otherwise expressly limited.

In the several embodiments provided in the present application, it should be understood that the apparatuses and methods disclosed can be realized in other ways. For example, the apparatuses embodiments described above are merely schematic, e.g., the division of the units described, is merely a logical functional division, and the actual implementation is divided in other ways, e.g., multiple units or components are combined or are integrated into another system, or some features are ignored, or not implemented. Another point is that the mutual coupling or direct coupling or communication connection shown or discussed is an indirect coupling or communication connection through some interface, device or unit, which is electrical, mechanical or otherwise.

The units illustrated as separated components is or is not physically separated, and components displayed as units are or are not physical units, i.e., they are located in one place, or they are distributed to a plurality of network units. Some or all of these units are selected to fulfill the purpose of this embodiment scheme according to actual needs.

A person of ordinary skill in the art may understand that all or some of the steps for realizing the above embodiments are accomplished by hardware, or accomplished by a program that instructs the relevant hardware to do so, and the program is stored in a computer-readable storage medium, and that the storage medium referred to above is a read-only memory, a disk or a CD-ROM, or the like.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

The invention claimed is:

1. A display device, comprising a display panel and a control assembly, wherein the display panel is electrically connected to the control assembly, the display panel comprises a display region, and the control assembly is configured to:

acquire display data;

control the display panel to display based on the display data;

detect whether target pixels are present in the display region, wherein the target pixels comprise bright pixels whose brightness reaches a specified brightness during a designated time period; and reduce brightness of the target pixels in response to the target pixels being present in the display region;

wherein the control assembly is further configured to:

determine whether the bright pixels are present in a corner area of the display region; and determine whether the bright pixels are the target pixels in response to the bright pixels being present in the corner area; and wherein the control assembly is further configured to:

determine a proportion value of the bright pixels in the corner area;

determine whether an image displayed in the display region is a static image in response to the proportion value falling within a target proportion range; and determine that the bright pixels are the target pixels in response to the image displayed in the display region being not the static image.

2. The display device according to claim 1, wherein the control assembly is further configured to:

acquire a specified number of reference display images, wherein each of the reference display images contains a logo of a content provider of the reference display image;

acquire reference proportions of the logo in each of the reference display images in the corner area of the display region; and determine the target proportion range based on a maximum value and a minimum value among the reference proportions.

3. The display device according to claim 1, wherein the control assembly is further configured to:

determine that the bright pixels in the corner area are not the target pixels in response to the proportion value not falling within the target proportion range.

4. The display device according to claim 1, wherein the control assembly is further configured to:

acquire an average brightness of first pixels in the corner area during the designated time period, wherein the designated time period is a time period prior to a current moment; and determine that the first pixels are the bright pixels in response to the average brightness being greater than or equal to the specified brightness.

5. The display device according to claim 1, wherein the control assembly is further configured to:

acquire minimum brightness of first pixels in the corner area during the designated time period, wherein the designated time period is a time period prior to a current moment; and determine that the first pixels are the bright pixels in response to the minimum brightness is greater than or equal to the specified brightness.

6. The display device according to claim 1, wherein the control assembly is further configured to:

acquire a duration when brightness of first pixels in the corner area is greater than or equal to the specified brightness during the designated time period, wherein the designated time period is a time period prior to a current moment; and determine that the first pixels are the bright pixels in a case that the duration is greater than or equal to a designated duration.

7. The display device according to claim 1, wherein the control assembly is further configured to:

reduce brightness of the display region as a whole in response to the image displayed in the display region being the static image.

8. The display device according to claim 1, wherein the control assembly is further configured to:

acquire first brightness data for a current frame set of the display device, wherein the current frame set is a set at least comprising a current frame;

acquire second brightness data for a history frame set of the display device, wherein the history frame set is a set at least comprising a frame preceding the current frame; and determine that the image displayed in the display region is the static image in response to a difference between the first brightness data and the second brightness data being less than a specified brightness threshold.

9. The display device according to claim 8, wherein the control assembly is further configured to:

determine the specified brightness threshold based on the second brightness data, wherein the specified brightness threshold is a product of the second brightness data and a target proportion range.

10. The display device according to claim 1, wherein the control assembly is further configured to:

acquire brightness data for the target pixels at the designated time period;

determine an attenuation factor corresponding to the brightness data in a predetermined look-up table based on the brightness data, wherein the look-up table comprises a plurality of brightness data and attenuation factors corresponding to each of the brightness data;

determine an attenuated brightness of the target pixels based on a predetermined formula, wherein the predetermined formula comprises e=d*a*b, e represents the attenuated brightness, d represents current brightness of the target pixels, a represents the attenuation factor, and b represents the brightness data for the target pixels at the designated time period; and reduce the current brightness of the target pixels to the attenuated brightness.

11. The display device according to claim 10, wherein the control assembly is further configured to:

acquire brightness of the target pixels in each of frames during the designated time period; and determine the brightness data based on the brightness of the target pixels in each of frames.

12. A display control method for a display device, comprising:

acquiring display data;

controlling the display panel to display based on the display data;

detecting whether target pixels are present in a display region, wherein the target pixels comprise bright pixels whose brightness reaches a specified brightness during a designated time period; and reducing brightness of the target pixels in response to the target pixels being present in the display region;

wherein the method further comprises:

determining whether the bright pixels are present in a corner area of the display region; and determining whether the bright pixels are the target pixels in response to the bright pixels being present in the corner area, wherein determining whether the bright pixels are the target pixels in response to the bright pixels being present in the corner area comprises:

determining a proportion value of the bright pixels in the corner area;

determining whether an image displayed in the display region is a static image in response to the proportion value falling within a target proportion range; and determining that the bright pixels are the target pixels in response to the image displayed in the display region being not the static image.

13. A display device comprising a processor and a memory storing at least one instruction, at least one program segment, a code set, or an instruction set therein, wherein the processor, when loading and executing the at least one instruction, the at least one program segment, the code set, or the instruction set, is caused to perform the display control method as defined in claim 12.

14. The method according to claim 12, further comprising:

acquiring a specified number of reference display images, wherein each of the reference display images contains a logo of a content provider of the reference display image;

acquiring reference proportions of the logo in each of the reference display images in the corner area of the display region; and determine the target proportion range based on a maximum value and a minimum value among the reference proportions.

15. The method according to claim 12, further comprising:

determining that the bright pixels in the corner area are not the target pixels in response to the proportion value not falling within the target proportion range.

16. The method according to claim 12, further comprising:

acquiring an average brightness of first pixels in the corner area during the designated time period, wherein the designated time period is a time period prior to a current moment; and determining that the first pixels are the bright pixels in response to the average brightness being greater than or equal to the specified brightness.

17. The method according to claim 12, further comprising:

acquiring minimum brightness of first pixels in the corner area during the designated time period, wherein the designated time period is a time period prior to a current moment; and determining that the first pixels are the bright pixels in response to the minimum brightness is greater than or equal to the specified brightness.

18. The method according to claim 12, further comprising:

acquiring a duration when brightness of first pixels in the corner area is greater than or equal to the specified brightness during the designated time period, wherein the designated time period is a time period prior to a current moment; and determining that the first pixels are the bright pixels in a case that the duration is greater than or equal to a designated duration.

19. The method according to claim 12, further comprising:

reducing brightness of the display region as a whole in response to the image displayed in the display region being the static image.

20. A non-transitory computer storage medium storing at least one instruction, at least one program segment, a code set, or an instruction set therein, wherein the at least one instruction, the at least one program segment, the code set, or the instruction set, when loaded and executed by a processor, causes the processor to perform:

acquiring display data;

controlling the display panel to display based on the display data;

detecting whether target pixels are present in a display region, wherein the target pixels comprise bright pixels whose brightness reaches a specified brightness during a designated time period; and reducing brightness of the target pixels in response to the target pixels being present in the display region;

wherein the at least one instruction, the at least one program segment, the code set, or the instruction set, when loaded and executed by the processor, further causes the processor to perform;

determining whether the bright pixels are present in a corner area of the display region; and determining whether the bright pixels are the target pixels in response to the bright pixels being present in the corner area; wherein the at least one instruction, the at least one program segment, the code set, or the instruction set, when loaded and executed by the processor, further causes the processor to perform:

determining a proportion value of the bright pixels in the corner area;

determining whether an image displayed in the display region is a static image in response to the proportion value falling within a target proportion range; and determining that the bright pixels are the target pixels in response to the image displayed in the display region being not the static image.

* * * * *